(12) United States Patent
Rigosi

(10) Patent No.: US 8,343,602 B2
(45) Date of Patent: Jan. 1, 2013

(54) PROPYLENE POLYMERS FOR INJECTION MOLDING APPLICATIONS

(75) Inventor: Gian Luigi Rigosi, Ferrara (IT)

(73) Assignee: Basell Poliolefine Italia, s.r.l., Milan (IT)

( * ) Notice: Subject to any disclaimer, the term of this patent is extended or adjusted under 35 U.S.C. 154(b) by 872 days.

(21) Appl. No.: 12/224,058

(22) PCT Filed: Jan. 15, 2007

(86) PCT No.: PCT/EP2007/050335
§ 371 (c)(1),
(2), (4) Date: Aug. 15, 2008

(87) PCT Pub. No.: WO2007/096209
PCT Pub. Date: Aug. 30, 2007

(65) Prior Publication Data
US 2009/0047456 A1 Feb. 19, 2009

Related U.S. Application Data

(60) Provisional application No. 60/776,608, filed on Feb. 24, 2006.

(30) Foreign Application Priority Data

Feb. 23, 2006 (EP) .................................... 06110321

(51) Int. Cl.
*B32B 1/08* (2006.01)
*B32B 3/26* (2006.01)
*B29C 45/16* (2006.01)
*C08L 23/06* (2006.01)
*A61M 25/00* (2006.01)
*B29B 13/00* (2006.01)
*C08L 23/00* (2006.01)

(52) U.S. Cl. ....... 428/35.8; 264/279; 264/262; 264/135; 264/264; 264/271.1; 525/240

(58) Field of Classification Search ................ 428/35.8; 264/279, 262, 135, 264, 271.1; 525/240
See application file for complete search history.

(56) References Cited

U.S. PATENT DOCUMENTS

| | | | |
|---|---|---|---|
| 4,971,937 A | 11/1990 | Albizzati et al. | |
| 5,256,226 A | 10/1993 | Marzola et al. | |
| 5,494,953 A | 2/1996 | Rigosi et al. | |
| 5,536,349 A | 7/1996 | Marzola et al. | |
| 5,565,051 A | 10/1996 | Marzola et al. | |
| 5,698,487 A | 12/1997 | Sacchetti et al. | |
| 5,698,642 A | 12/1997 | Govoni et al. | |
| 6,399,533 B2 | 6/2002 | Sacchetti et al. | |
| 6,413,477 B1 | 7/2002 | Govon et al. | |
| 6,423,660 B1 | 7/2002 | Albizzati et al. | |
| 6,444,604 B1 | 9/2002 | Albizzati et al. | |
| 6,455,630 B1 | 9/2002 | Rigosi et al. | |
| 6,461,703 B1 | 10/2002 | Rigosi | |
| 6,491,984 B2 | 12/2002 | Rigosi et al. | |
| 6,559,252 B1 | 5/2003 | Horton et al. | |
| 6,608,224 B2 | 8/2003 | Resconi et al. | |
| 6,689,845 B1 | 2/2004 | Govoni et al. | |
| 6,774,194 B2 | 8/2004 | Albizzati et al. | |
| 6,818,187 B2 | 11/2004 | Govoni et al. | |
| 6,818,583 B1 | 11/2004 | Morini et al. | |
| 6,825,309 B2 | 11/2004 | Morini et al. | |
| 6,841,501 B2 | 1/2005 | Resconi et al. | |
| 6,843,950 B1 | 1/2005 | Mally et al. | |
| 6,878,786 B2 | 4/2005 | Resconi et al. | |
| 6,893,590 B1 * | 5/2005 | Rigosi et al. .................. 264/135 |
| 6,953,829 B2 | 10/2005 | Kratzer et al. | |
| 7,022,640 B2 | 4/2006 | Morini et al. | |
| 7,049,377 B1 | 5/2006 | Morini et al. | |
| 7,101,940 B2 | 9/2006 | Schottek et al. | |
| 7,141,527 B1 | 11/2006 | Van Baar et al. | |
| 7,163,907 B1 | 1/2007 | Canich et al. | |
| 7,169,871 B2 | 1/2007 | Morini et al. | |
| 7,314,903 B2 | 1/2008 | Resconi et al. | |
| 7,417,006 B2 | 8/2008 | Resconi et al. | |
| 2004/0197059 A1 | 10/2004 | Castellani et al. | |
| 2005/0032633 A1 | 2/2005 | Morini et al. | |
| 2006/0041072 A1 | 2/2006 | Pelliconi et al. | |
| 2006/0047071 A1 | 3/2006 | Pelliconi et al. | |
| 2008/0033122 A1 | 2/2008 | Denifl et al. | |

FOREIGN PATENT DOCUMENTS

| | | |
|---|---|---|
| DE | 19962814 | 6/2001 |
| DE | 19962910 | 7/2001 |
| EP | 45977 | 2/1982 |
| EP | 361494 | 4/1990 |
| EP | 633272 | 1/1995 |
| EP | 728769 | 8/1996 |
| EP | 782587 | 7/1997 |
| EP | 1272533 | 1/2003 |
| WO | 91/02012 | 2/1991 |

(Continued)

OTHER PUBLICATIONS

Notice of Opposition by Dow Chemical Company of EP1987098, European counterpart of U.S. Appl. No. 12/224,058, mailed Jan. 4, 2011, pp. 1, 61-80.
Datasheet, "Exact 0201", DexPlastomers, DSM-Exxonmobil Chemicals Octene-1 Plastomer Mar. 2002, 1-4.
Datasheet "Exact 8201", DexPlastomers; DSM/Exxonmobil Chemicals Octene-1 Plastomer Mar. 2002, 1-2.
ISO 180 "Plastics—Determination of izod impact strength", 2006, 1-2.
Yu, Thomas C. et al., "Impact Enhancement of Clarified Polypropylene with selected Mettallocene Plastomers", Annual Technical Conference-Society of Plastics Engineers 59th, vol. 2 2001, 1688-1692.
IDS 6603-1, "Plastics-Determination of puncture impact behavior of rigid plastics—Part 1: Non-instrumented impact testing", 2000, 1-21.

(Continued)

*Primary Examiner* — William Cheung
(74) *Attorney, Agent, or Firm* — Dilworth IP LLC

(57) ABSTRACT

Use of propylene copolymers with up to 50 wt % of units derived from at least one linear or branched alpha-olefin having from 2 to 10 carbon atoms other than propylene for producing injection-molded coating on a metallic pipe.

5 Claims, No Drawings

FOREIGN PATENT DOCUMENTS

| | | |
|---|---|---|
| WO | 92/00333 | 1/1992 |
| WO | 95/32995 | 12/1995 |
| WO | 99/21899 | 5/1999 |
| WO | 99/21916 | 5/1999 |
| WO | 00/02929 | 1/2000 |
| WO | WO-00/59990 | 3/2000 |
| WO | 00/59990 | 10/2000 |
| WO | 00/63261 | 10/2000 |
| WO | 01/21674 | 3/2001 |
| WO | 01/62764 | 8/2001 |
| WO | 02/102811 | 12/2002 |
| WO | 03/051984 | 6/2003 |
| WO | WO-2004/003072 | 6/2003 |
| WO | WO-03051984 | 6/2003 |
| WO | 2004/003072 | 1/2004 |
| WO | 2004/005360 | 1/2004 |
| WO | 2005/113613 | 12/2005 |
| WO | 2007/003523 | 1/2007 |

OTHER PUBLICATIONS

ISO-180 "Plastics—Determination of izod impact strength", 200, 1-10, 2010.

Moore, Jr., Edward P., "Polypropylene Handbook", Hanser/Gardner Publications 1996, 239-249.

Yu, T.C., "Impact Modification of Polypropylenes with Exact(TM) Plastomers", ANTEC '94 1994, 2436-2445.

Davis, Donna et al., "Ethylene Incorporation in Polypropylene: Effect on Thermal-Related Properties", Proceedings; Polymers, Laminations & Coatings Conference TAPPI Press 1991, 344-348.

Datasheet,"Exact (tm) 4042", Exxon Chemical Plastomer Resin for Polymer Modification Oct. 18, 1993, 1.

ISO 6603-2 "Plastics-Determination of puncture impact behaviour of rigid plastics Part 2: Instrumented impact testing", Second edition Oct. 1, 2000, 1-23.

\* cited by examiner

PROPYLENE POLYMERS FOR INJECTION MOLDING APPLICATIONS

This application is the U.S. national phase of International Application PCT/EP2007/050335, filed Jan. 15, 2007, claiming priority to European Application 06110321.4 filed Feb. 23, 2006 and the benefit under 35 U.S.C. 119(e) of U.S. Provisional Application No. 60/776,608, filed Feb. 24, 2006; the disclosures of International Application PCT/EP2007/050335, European Application 06110321.4 and U.S. Provisional Application No. 60/776,608, each as filed, are incorporated herein by reference.

The present invention relates to the use of propylene polymers for producing an injection-molded coating on metallic pipes. In particular, the present invention concerns the use of propylene polymers for the re-insulation of the connected portion of plastic-insulated metallic pipes.

For the construction of pipelines subjected to particularly aggressive environmental conditions, both for underwater and in the soil applications, plastic-insulated metallic pipes are widely used. To ensure that the plastic coating is not damaged by the welding operations to connect pipes, the plastic coating is removed in the region of the end sides of said pipes prior to welding and therefore, after two pipes have been connected, the uncoated connected parts have to be re-insulated in order to prevent external aggression (corrosion). In recent years, new methods for the re-insulation of the connected portion of plastic-insulated metallic pipes have been developed. Known processes for re-insulation of plastic-coated metallic pipes include several steps: pipe steel surface preparation, pipe steel heating, spraying of a primer, application of an adhesive polymer, application of a polymeric top layer. The U.S. Pat. No. 6,843,950 describes a method for the application of a polymeric top layer onto the circular weld seams of pipelines formed by metallic pipes which are provided with a plastic insulating coating. Said method comprises fitting a split injection mold onto the connected pipes partially overlapping the plastic insulating layer of the pipes and injecting melted plastic material into the cavity formed between the mold and the outer surface of the pipes, whereby the melted plastic cools and solidifies thereby forming a sheath which is sealed to the existing plastic insulation coating of the pipes. Typically the melted plastic is injected into the mold with a pressure of less than 25 MPa and a temperature not exceeding 230° C. The injection-molded re-insulating sheath is normally more than 10 mm thick in the region not overlapping the existing insulating layer. In order to easily and quickly fill the molds, plastic materials, in particular thermoplastic propylene polymers, known in the art to be suitable for the use in injection-molding processes, should have relatively high melt flow rates. Polyolefin compositions for injection molding are disclosed for example, in the International patent application WO2004/003072, said polyolefin compositions comprising a crystalline propylene homo- or copolymer and a copolymer of ethylene with an alpha-olefin having 4 to 10 carbon atoms and having melt flow rate higher than 20 g/10 min. The European patent application EP1456294 discloses polyolefin compositions having relatively high melt flow rates and a good balance of properties, such as flexural modulus and impact resistance, said compositions comprising a crystalline propylene homo- or copolymer and a blend of a propylene/ethylene copolymer and an ethylene/$C_4$-$C_{10}$ copolymer.

However, the need was felt of propylene polymers which possess high melt flow rates in combination with a good balance of physical-mechanical properties and which are suitable for injection-molding applications, in particular for the re-insulation of the connected portion of plastic-insulated metallic pipes.

The present invention concerns the use of a propylene copolymer (I) containing up to 50 wt %, preferably from 0.5 to 30 wt %, more preferably 1 to 20 wt %, of units derived from at least one linear or branched alpha-olefin having from 2 to 10 carbon atoms other than propylene for producing an injection-molded coating on a metallic pipe, said copolymer (I) having the following set of properties (a) to (d):

(a) Melting peak temperature (Tpm) equal to or less than 160° C., preferably ranging from 135° to 160° C., more preferably from 135° to 150° C.;

(b) Crystallization peak temperature (Tpc) equal to or higher than 100° C., preferably ranging from 100° to 115° C.;

(c) Tpm-Tpc equal to or less than 55° C., preferably equal to o less than 45° C., more preferably (Tpm-Tpc) is comprised in the range from 30° to 42° C.;

(d) MFR (ISO1133, 230° C./2.16 Kg) value ranging from 15 to 600 g/10 min; preferably ranging from 25 to 200 g/10 min, more preferably from 30 to 100 g/10 min. Tpm and Tpc are measured by DSC according to the ISO methods 11357-1:1997 and 11357-3:1999. Tpm is the melting peak temperature of the material, i.e. the temperature at which the DSC curve reaches the absolute maximum in an heating cycle. Tpc is the crystallization peak temperature of the material, i.e. the temperature at which the DSC curve reaches the absolute minimum in a cooling cycle.

Preferably, the propylene copolymer (I) to be used according to the instant invention is also endowed with at least one property of the following set:

Molecular Weight Distribution (MWD), expressed as Mw/Mn and measured by GPC under the conditions indicated below, namely lower than 4.0, preferably ranging from 1.5 to 3.5; and/or spiral flow at 230° C. and 100 bar higher than 1100 mm, preferably higher than 1200 mm, more preferably higher than 1300 mm. The spiral flow is determined according to the method described below.

Propylene copolymer (I) to be used according to the present invention is preferably selected among:

(i) propylene copolymers with at least one linear or branched alpha-olefin having from 2 to 10 carbon atoms other than propylene, said copolymer containing from 0.05 to 15 wt %, with respect to the weight of the copolymer, of alpha-olefin units and having solubility in xylene lower than 15 wt %, preferably lower than 10 wt %;

(ii) propylene copolymer compositions comprising at least two propylene copolymers as described in (i), said copolymers having a different content of alpha-olefin units other than propylene;

(iii) propylene copolymer compositions comprising at least one propylene copolymer as described in (i) and at least one propylene homopolymer having solubility in xylene lower than 15 wt %, preferably lower than 10 wt %, more preferably lower than 5 wt %; and (iv) propylene polymer compositions comprising:

(A) 60-95 wt % of a propylene polymer selected among propylene homopolymers having solubility in xylene lower than 15 wt %, preferably lower than 10 wt %, more preferably lower than 5 wt %, propylene copolymers as described in (i), propylene copolymer compositions as described in (ii) or in (iii) and (B) 5 to 40 wt %, with respect to the weight of the composition (iv), of a propylene copolymer with at least one linear or branched alpha-olefin having from 2 to 10 carbon atoms other than propylene, said copolymer (B) containing up to 50 wt %, with respect to the copolymer (B), preferably from 10 to 50 wt %, more preferably from 15 to 30 wt %, of alpha-olefin units and having solubility in xylene of at least 50 wt %.

Preferred alpha-olefins other than propylene are linear $C_2$-$C_{10}$-1-alkenes, in particular ethylene, 1-butene, 1-pentene, 1-hexene, 1-heptene, 1-octene, 4-methyl-1-pentene, ethylene being particularly preferred.

Propylene copolymers (i) preferably contain from 0.05 to 10 wt % of alpha-olefin units other than propylene, more preferably from 1 to 8 wt %, particularly preferably from 1.5 to 5 wt %.

Propylene polymer compositions as described in (ii) and (iii) typically have a total content of alpha-olefin units of up to 15 wt %, preferably ranging from 1 to 15 wt %, more preferably from 1 to 10 wt %.

The component (B) of the propylene polymer compositions (iv) preferably has solubility in xylene higher than 70 wt %. The component (B) of the propylene polymer compositions (iv) may optionally contain minor quantities (in particular, from 1 to 10 wt %) of a diene, such as butadiene, 1,4-hexadiene, 1,5-hexadiene, ethylidene-1-norbornene.

The propylene copolymer (I) to be used according to the invention can be prepared for example by polymerizing propylene and suitable comonomers in the presence of Ziegler-Natta catalysts comprising a solid catalyst component comprising at least one titanium compound having at least one titanium-halogen bond and at least an electron-donor compound (internal donor), both supported on magnesium chloride. The Ziegler-Natta catalyst systems further comprise an organo-aluminum compound as essential co-catalyst and optionally an external electron-donor compound. Suitable catalyst systems are described in the European patents EP45977, EP361494, EP728769, EP 1272533 and in the international patent application WO00/6321. Alternatively, and more preferably, the propylene copolymer (I) to be used according to the invention can be prepared by polymerizing propylene and suitable comonomers in the presence of a metallocene-based catalyst system. In particular, said propylene copolymers are obtainable by using a catalyst system obtainable by contacting:

a) a metallocene compound of formula (I):

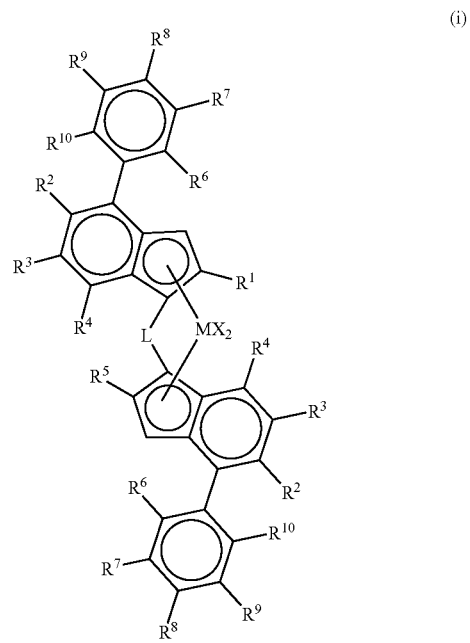

(i)

wherein

M is a transition metal belonging to group 3, 4, 5, 6 or to the lanthanide or actinide groups in the Periodic Table of the Elements; preferably M is titanium, zirconium or hafnium;

X same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or ethyl radicals;

L is a divalent $C_1$-$C_{40}$ hydrocarbon radical optionally containing heteroatoms belonging to groups 13-17 of the Periodic Table of the Elements or a divalent silylidene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silyliene radical containing up to 5 silicon atoms such as $SiMe_2$, $SiPh_2$; preferably L is a group $(Z(R'')_2)_n$ wherein Z is a carbon or a silicon atom, n is 1 or 2 and R" is a $C_1$-$C_{20}$ hydrocarbon radical optionally containing heteroatoms belonging to groups 13-17 of the Periodic Table of the Elements; preferably R" is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably the group $(Z(R'')_2)_n$ is Si(CH$_3$)$_2$, SiPh$_2$, SiPhMe, SiMe(SiMe$_3$), CH$_2$, (CH$_2$)$_2$, and C(CH$_3$)$_2$; even more preferably (Z(R")$_2$)$_n$ is Si(CH$_3$)$_2$;

R$^1$ and R$^5$ are a C$_1$-C$_{40}$ hydrocarbon radical optionally containing heteroatoms belonging to groups 13-17 of the Periodic Table of the Elements; preferably R$^1$ and R$^5$ are linear or branched, cyclic or acyclic, C$_1$-C$_{40}$-alkyl, C$_2$-C$_{40}$ alkenyl, C$_2$-C$_{40}$ alkynyl, C$_6$-C$_{40}$-aryl, C$_7$-C$_{40}$-alkylaryl or C$_7$-C$_{40}$-arylalkyl radicals; optionally containing heteroatoms belonging to groups 13-17 of the Periodic Table of the Elements; more preferably R$^1$ and R$^5$ are a linear or branched, saturated or unsaturated C$_1$-C$_{20}$-alkyl radical;

R$^2$, R$^3$ and R$^4$, equal to or different from each other, are hydrogen atoms or C$_1$-C$_{40}$ hydrocarbon radicals optionally containing heteroatoms belonging to groups 13-17 of the Periodic Table of the Elements; preferably R$^2$, R$^3$ and R$^4$, equal to or different from each other are hydrogen atoms or linear or branched, cyclic or acyclic, C$_1$-C$_{40}$-alkyl, C$_2$-C$_{40}$ alkenyl, C$_2$-C$_{40}$ alkynyl, C$_6$-C$_{40}$-aryl, C$_7$-C$_{40}$-alkylaryl or C$_7$-C$_{40}$-arylalkyl radical; optionally containing heteroatoms belonging to groups 13-17 of the Periodic Table of the Elements; more preferably R$^2$, R$^3$ and R$^4$ are hydrogen atoms or C$_1$-C$_{20}$-alkyl radicals;

R$^6$, R$^7$, R$^8$, R$^9$, and R$^{10}$ equal to or different from each other, are hydrogen atoms or C$_1$-C$_{40}$ hydrocarbon radicals optionally containing heteroatoms belonging to groups 13-17 of the Periodic Table of the Elements; preferably R$^2$, R$^3$ and R$^4$, equal to or different from each other are hydrogen atoms or linear or branched, cyclic or acyclic, C$_1$-C$_{40}$-alkyl, C$_2$-C$_{40}$ alkenyl, C$_2$-C$_{40}$ alkynyl, C$_6$-C$_{40}$-aryl, C$_7$-C$_{40}$-alkylaryl or C$_7$-C$_{40}$-arylalkyl radical; optionally containing heteroatoms belonging to groups 13-17 of the Periodic Table of the Elements; more preferably R$^2$, R$^3$ and R$^4$ are hydrogen atoms or C$_1$-C$_{40}$-alkyl radicals; with the proviso that at least one among R$^6$, R$^7$, R$^8$, R$^9$, and R$^{10}$ is different from an hydrogen atom; preferably R$^6$, R$^7$, R$^9$, and R$^{10}$R$^8$ are hydrogen atoms; preferably R$^8$ is a C$_1$-C$_{40}$-alkyl radicals, more preferably R$^8$ is a C$_1$-C$_{40}$-alkyl radical wherein the atom in the alpha position is a secondary carbon or a tertiary carbon, such as isopropyl or tertbutyl radicals;

b) at least an alumoxane or a compound able to form an alkylmetallocene cation; and c) optionally an organo aluminum compound.

In one embodiment the substituent R$^1$ and R$^5$ in the compound of formula (I) are the same and they preferably are C$_1$-C$_{20}$-alkyl radicals such as methyl or ethyl radicals.

In another embodiment the substituent R$^1$ is a linear C$_1$-C$_{40}$-alkyl radical such as methyl or ethyl radicals and the substituent R$^5$ is a branched C$_1$-C$_{40}$-alkyl radical, preferably the substituent R$^5$ is a branched C$_1$-C$_{40}$-alkyl radical wherein the carbon atom in the alpha position is a secondary or a tertiary carbon atom, such as an isopropyl radical.

Alumoxanes used as component b) in the catalyst system according to the present invention can be obtained by reacting water with an organo-aluminum compound of formula H$_j$AlU$_{3-j}$ or H$_j$Al$_2$U$_{6-j}$, where the U substituents, same or different, are hydrogen atoms, halogen atoms, C$_1$-C$_{20}$-alkyl, C$_3$-C$_{20}$-cycloalkyl, C$_6$-C$_{20}$-aryl, C$_7$-C$_{20}$-alkylaryl or C$_7$-C$_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1. Said alumoxanes are considered to be linear, branched or cyclic compounds containing at least one group of the type:

wherein the substituents U, same or different, are defined above.

In particular, alumoxanes of the formula:

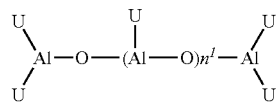

can be used in the case of linear compounds, wherein n$^1$ is 0 or an integer of from 1 to 40 and the substituents U are defined as above; or alumoxanes of the formula:

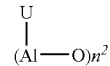

can be used in the case of cyclic compounds, wherein n$^2$ is an integer from 2 to 40 and the U substituents are defined as above. Examples of alumoxanes suitable as component b) are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO). Other compounds that can be conveniently used as component b) are those described in WO 99/21899 and in WO01/21674 in which the alkyl and aryl groups have specific branched patterns, in particular trimethylaluminium (TMA), triisobutylaluminium (TIBA), tris(2,4,4-trimethyl-pentyl) aluminium (TIOA), tris(2,3-dimethylbutyl)aluminium (TDMBA) and tris(2,3,3-trimethylbutyl)aluminium (TTMBA) are preferred.

Non-limiting examples of compounds able to form an alkylmetallocene cation are compounds of formula D$^+$E$^-$, wherein D$^+$ is a Brønsted acid, able to donate a proton and to react irreversibly with a substituent X of the metallocene of formula (I) and E$^-$ is a compatible anion, which is able to stabilize the active catalytic species originating from the reaction of the two compounds, and which is sufficiently labile to be removed by an olefinic monomer. Preferably, the anion E$^-$ comprises one or more boron atoms. More preferably, the anion E$^-$ is an anion of the formula BAr$_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Additional examples of compounds of formula D$^+$E$^-$ can be found in WO 04/005360, WO 02/102811 and WO 01/62764. Moreover, compounds of formula BAr$_3$ can be conveniently used. Compounds of this type are described, for example, in the International patent application WO 92/00333. Other examples of compounds able to form an alkylmetallocene cation are compounds of formula BAr$_3$P wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Organic aluminum compounds used as compound c) are those of formula $H_jAlU_{3-j}$ or $H_jAl_2U_{6-j}$ as described above.

The metallocene catalyst system described above can also be supported on an inert carrier. This is achieved by depositing the metallocene compound a) or the product of the reaction thereof with the component b), or the component b) and then the metallocene compound a) on an inert support such as, for example, silica, alumina, Al—Si, Al—Mg mixed oxides, magnesium halides, styrene/divinylbenzene copolymers, polyethylene or polypropylene. The supportation process is carried out in an inert solvent such as hydrocarbon for example toluene, hexane, pentane or propane and at a temperature ranging from 0° C. to 100° C., preferably the process is carried out at room temperature. A suitable class of supports which can be used is that constituted by porous organic supports functionalized with groups having active hydrogen atoms. Particularly suitable are those in which the organic support is a partially crosslinked styrene polymer. Supports of this type are described in European application EP-633 272. Another class of inert supports particularly suitable for use according to the invention is that of polyolefin porous prepolymers, particularly polyethylene. A further suitable class of inert supports for use according to the invention is that of porous magnesium halides such as those described in International application WO 95/32995. The solid compound thus obtained, in combination with the further addition of the alkylaluminum compound either as such or pre-reacted with water if necessary, can be usefully employed in polymerization of propylene and the suitable comonomers.

The polymerization process can be carried out in gas phase and/or in liquid phase, in continuous or batch reactors, such as fluidized bed or slurry reactors in single or multi-step processes; the gas-phase polymerization process may also conveniently be carried out in at least two interconnected polymerization zones, as described in EP782587 and WO00/02929. The reaction time, temperature and pressure of the polymerization reaction are not critical, however the temperature for the preparation of the propylene copolymers to be used according to the present invention usually ranges from 50° C. to 120° C.; the polymerization pressure preferably ranges from 0.5 to 12 MPa when the polymerization is carried out in gas-phase.

The propylene polymer compositions (ii) to (iv) may also be prepared by dry- and/or melt-blending the different components obtained separately according to known methods. According to a most preferred embodiment, the propylene copolymer (I) to be used according to the instant invention additionally has at least one of the following properties:

Charpy Notched Impact Strength at −20° C. (ISO 179) higher than 1 kJ/m$^2$; and/or Izod Impact Strength at −20° C. (ISO 180/1A) higher than 1 kJ/m$^2$.

Said values of Izod and/or Charpy Notched Impact Strength are preferably achieved by blending the propylene copolymers (i) to (iv) described herein above with at least one thermoplastic elastomer having a ductile/brittle transition temperature lower than −20° C., preferably lower than −40° C. and/or a Notched Izod Impact Strength at −20° C. higher than 5 kJ/m$^2$, preferably higher than 8 kJ/m$^2$. A propylene copolymer (I) particularly suitable for the use according to the present invention comprises 75-95 wt %, preferably 80-90 wt %, of a propylene copolymer selected among propylene copolymers (i) to (iv) as described in the foregoing and 5-25 wt %, preferably 10-20 wt %, of at least one thermoplastic elastomer having a ductile/brittle transition temperature lower than −20° C., preferably lower than −40° C. and/or a Notched Izod Impact Strength at −20° C. higher than 5 kJ/m$^2$, preferably higher than 8 kJ/m$^2$. Suitable thermoplastic-elastomers are olefinic rubbers, such as the copolymers of ethylene with at least one alpha-olefin having from 3 to 10 carbon atoms containing from 30 to 75 wt %, preferably 40-60 wt %, more preferably 40-50 wt % of ethylene units and having solubility in xylene higher than 50 wt %, preferably higher than 80 wt %, said copolymers optionally containing 1-10 wt % a diene, such as butadiene, 1,4-hexadiene, 1,5-hexadiene, ethylidene-1-norbornene. Examples of said copolymers are ethylene/propylene rubber (EPR), ethylene/propylene/diene rubber (EPDR) and ethylene/alpha-olefin rubber. Other suitable thermoplastic-elastomers are elastomeric propylene polymers from metallocenes, atactic propylene homopolymers, impact propylene copolymers, butadiene rubbers and styrene-butadiene copolymers.

Particularly preferred thermoplastic elastomer are thermoplastic polyolefins selected among:

(A) a propylene polymer compositions comprising:

(A1) 5-50 wt %, preferably 10-40 wt %, of a polymer fraction selected among propylene homopolymers having solubility in xylene lower than 15 wt %, preferably lower than 10 wt %, more preferably from 1 to 10 wt %; propylene copolymers with at least one linear or branched alpha-olefin having from 2 to 10 carbon atoms other than propylene, said copolymer containing from 0.05 to 15 wt %, preferably from 0.5 to 10 wt %, with respect to the weight of the copolymer, of alpha-olefin units and having solubility in xylene lower than 15 wt %, preferably lower than 10 wt % and blends thereof;

(A2) 0-20 wt %, preferably 0-15 wt %, of a copolymer of ethylene with at least one linear or branched alpha-olefin having from 3 to 10 carbon atoms, said copolymer being insoluble in xylene; and (A3) 40-95 wt %, preferably 50-75 wt %, of a copolymer of propylene with at least one linear or branched alpha-olefin having 2 to 10 carbon atoms other than propylene, said copolymer containing less than 40 wt % of alpha-olefin units, preferably from 20 to 38 wt %, (with respect to the component (A3)) and having solubility in xylene higher than 50 wt %, preferably higher than 80 wt %, more preferably being completely soluble in xylene, said copolymer optionally containing 1-10 wt % a diene, such as butadiene, 1,4-hexadiene, 1,5-hexadiene, ethylidene-1-norbornene;

(B) a propylene polymer composition comprising:

(B1) 8-25 wt % of a polymer fraction as described in (A1) and (B2) 75-92 wt % of a polymer fraction comprising:

(I) a first copolymer of propylene with at least one linear or branched alpha-olefin having from 2 to 10 carbon atoms other than propylene, optionally containing 0.5 to 5% by weight of a diene, said first copolymer containing from 15 to 32 wt % of alpha-olefin units and having solubility in xylene greater than 50 wt %, the intrinsic viscosity of the xylene soluble fraction ranging from 3.0 to 5.0 dl/g; and (II) a second copolymer of propylene with at least one linear or branched alpha-olefin having 2 to 10 carbon atoms other than propylene, optionally containing 0.5 to 5% by weight of a diene, said second copolymer containing more than 32 wt % up to 45 wt % of alpha-olefin units, and having solubility in xylene greater than 80 wt %, the intrinsic viscosity of the xylene soluble fraction ranging from 4.0 to 6.5 dl/g; the (I)/(II) weight ratio ranging from 1:5 to 5:1;

(C) a propylene polymer composition comprising:

(C1) 50-98 wt %, preferably 60-wt %95, of a of a polymer fraction as described in (A1); and (C2) 2-50 wt %, preferably 5-40 wt % of an ethylene copolymer selected among (a) a copolymer of ethylene with at least one alpha-olefin having 4 to 10 carbon atoms containing from 60 to 85 wt % of ethylene units and (b) a composition comprising a copolymer as described in (a) and a copolymer of propylene with more than 15 wt % up to 40 wt % of ethylene, wherein the weight ratio (a)/(b) is preferably from 1/4 to 4/1.

The thermoplastic polyolefins (C) are particularly preferred.

The thermoplastic elastomers of compositions (A), (B) and (C) are commercially available on the market and can be prepared for example by polymerizing propylene and suitable comonomers in the presence of Ziegler-Natta catalysts comprising a solid catalyst component comprising at least one titanium compound having at least one titanium-halogen bond and at least an electron-donor compound (internal donor), both supported on magnesium chloride. The Ziegler-Natta catalyst systems further comprise an organo-aluminum compound as essential co-catalyst and optionally an external electron-donor compound. Suitable catalyst systems are described in the European patents EP45977, EP361494, EP728769, EP 1272533 and in the international patent application WO00/6321. Alternatively, the thermoplastic polyolefins can be prepared by polymerizing propylene and suitable comonomers in the presence of a metallocene-based catalyst system. The polymerization process can be carried out in gas phase and/or in liquid phase, in continuous or batch reactors, such as fluidized bed or slurry reactors in single or multi-step processes; the gas-phase polymerization process may also conveniently be carried out in at least two interconnected polymerization zones, as described in EP782587 and WO00/02929. The reaction time, temperature and pressure of the polymerization reaction are not critical, however the temperature for the preparation of the propylene copolymers to be used according to the present invention usually ranges from 50° C. to 120° C.; the polymerization pressure preferably ranges from 0.5 to 12 MPa when the polymerization is carried out in gas-phase.

The polymer copolymer (i) to (iv) and the thermoplastic elastomer can be dry- and/or melt-blended according to methods commonly used in the art.

The propylene copolymer (i) to (iv) and the thermoplastic elastomers may further comprise additives commonly employed in the polyolefin field, such as antioxidants, light stabilizers, antiacids, colorants, fillers and processing improvers in conventional amounts.

When propylene copolymers (1) having the peculiar combination of features (a) to (d) are used according to the invention for producing injection-molded coatings on metallic pipes, it is possible to obtain a thin injection-molded coating, in particular the injection-molded coating is up to 10 mm, preferably up to 4 mm, particularly preferably up to 3 mm thick.

The propylene copolymer (I) can be conveniently used for forming a re-insulating injection-molded coating on the connected portion of plastic-insulated metallic pipes. Accordingly, a further object of the present invention is a process for re-insulating the connected portion of two plastic-insulated metallic pipes, said process comprising the following steps:

(1) removing some plastic insulation from the end of each pipe;

(2) connecting the ends of the pipes together to form a circular connected region having an external diameter;

(3) fitting a split injection mold onto the connected region of the pipes, said injection mold having an internal diameter which is spaced from the external diameter of the of said connected region;

(4) injecting the propylene copolymer (I) into the cavity formed between said external diameter of the connected region and said internal diameter of the mold to obtain an injection-molded coating onto the connected region of the pipes and (5) cooling the injection-molded coating and removing the injection mold.

Normally, steps (1) and (2) are carried out according methods well known in the art. In particular, for plastic insulated metallic pipes, the connecting step (2) is carried out by welding together the ends of the two pipes deprived of the plastic insulating layer, thereby forming a weld seam. Before step (3) is carried out, the connected region can be conveniently blasted with known techniques to remove any surface imperfection and optionally, but preferably, known primers and polymer adhesives may be applied onto the connected region to promote the adhesion of the coating applied in step (4).

In step (4) a coating is formed onto the connected region of the connected metallic pipes, replacing the plastic insulating layer removed in step (1) and thereby re-insulating the metallic pipes. Normally, the coating formed in step (4) partially overlaps the existing plastic insulation of the metallic pipes. The melted propylene copolymer (I) is normally injected into the mold with a pressure of less than 25 MPa and a temperature not exceeding 230° C. Preferred injection molds, injection molding and cooling conditions to be used in steps (3) to (5) are described in U.S. Pat. No. 6,843,950.

It has surprisingly been found that when the propylene copolymer (I) are used in the process described above, it is possible to produce a thin and uniform injection-molded coating on the connected region of plastic-insulated metallic pipes. The injection-molded coating obtained with the re-insulating process described above is up to 10 mm, preferably up to 4 mm, more preferably up to 3 mm thick in the region not overlapping the existing insulating plastic layer of the metallic pipes. Moreover, the propylene copolymer (I) shows a good adhesion to the existing plastic insulating layer of the metallic pipe.

Due to the peculiar combination of features of the propylene copolymer (I) it has been found that cycle-time, namely the time needed to carry out steps (4) and (5), is significantly shortened with respect to the same process carried out using conventional plastic materials. In particular the cycle-time can be reduced by more than the 10%.

The following examples are given to illustrate, without limiting, the present invention. The analytical methods described hereinbelow have been used to determine the properties reported in the description and in the examples and comparative examples.

Tpm and Tpc: Determined by DSC with a temperature variation of 20° C. per minute according to ISO methods 11357-1:1997 and 11357-3:1999

Melt flow rate (MFR): ISO 1133 (230° C., 2.16 Kg)

Molecular weights and molecular weights distribution (Mw/Mn): Carried out by gel permeation chromatography (GPC) at 145° C. in 1,2,4-trichlorobenzene using a GPC apparatus model 150C from Waters. The data were evaluated by means of the Win-GPC software from HS-Entwicklungsgesellschaft für wissenschaftliche Hard-und Software GmbH, Ober-Hilbersheim. The columns were calibrated by means of polypropylene standards having molecular weights from 100 to 107 g/mol.

Spiral Flow: the spiral flow value determines how far a molten polymeric material flows into a hollow spiral before it solidifies. The molten polymer was injected into a hollow spiral mold under specified conditions of temperature (controlled by a thermostated water bath), at an injection pressures of 100 bar. The spiral flow, i.e. the total length of solidified polymeric material is recorded. The following apparatus and conditions were used:

| Injection press | Sandretto 190 |
| --- | --- |
| Clamping force | 190 ton |
| max. volume of injected polymer | 450 cm$^3$ |
| screw diameter | 50 mm |
| Mold | Archimede Spiral |
| thickness (gate depth) | 2.5 mm |
| width | 12.7 mm |
| wall sloping | 3 degrees |
| Processing conditions | |
| screw rotation speed | 120 rpm |
| melting temperature | 230° C. |
| mold temperature | 40° C. |
| holding pressure | 100 bar |
| holding time | 5 sec |
| cooling time | 20 sec |
| total cycle time | 31 sec |

Comonomer content: By IR spectroscopy.
Charpy Notched Impact Strength: ISO 179
IZOD Impact Strength: ISO 180/1A
Ductile/brittle transition temperature: ISO 6603-2 using the following conditions: velocity of the punch=4.4 m/s; diameter of the support ring=40 mm; diameter of the impact ring=20 mm; test specimen=6 cm×6 cm×2 mm. Temperature range=26° C. to −35° C.
Xylene-soluble faction: 2.5 g of polymer and 250 mL of o-xylene are introduced in a glass flask equipped with a refrigerator and a magnetical stirrer. The temperature is raised in 30 minutes up to the boiling point of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and 100 ml of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.
Flexural modulus: ISO 178
Tensile Modulus, Tensile Strength and Elongation at yield and at break: ISO 527-2
Vicat temperature: ISO 306 (9.81N)
Molar ratio of feed gasses: Determined by gas-chromatography
Preparation of the Metallocene Catalyst 3 kg of Sylopol 948 were placed in a process filter whose filter plate pointed downward and suspended in 15 liters of toluene. 7 liters of 30% strength by weight MAO solution (from Albemarle) were metered under stirring at such a rate that the internal temperature did not exceed 35° C. After stirring for a further 1 hour at a low stirrer speed, the suspension was filtered, firstly with no applied pressure and then under a nitrogen pressure of 3 bar. Parallel to the treatment of the support material, 2.0 liters of 30% strength by weight MAO solution were placed in a reaction vessel, 92.3 g of rac-dimethylsilyl(2-methyl-4-(4'-ter-butylphenyl)indenyl) (2-isopropyl-4-(4'-ter-butylphenyl)indenyl)zirconium dichloride were added, the solution was stirred for 1 hour and allowed to settle for a further 30 min. The solution was subsequently run onto the pretreated support material with the outlet closed. After the addition was complete, the outlet was opened and the filtrate was allowed to run off. The outlet was subsequently closed, the filter cake was stirred for 15 minutes and allowed to stand for 1 hour. The liquid was then pressed out from the filter cake by means of a nitrogen pressure of 3 bar with the outlet open. 15 liters of isododecane were added to the remained solid, the mixture was stirred for 15 minutes and filtered. The washing step was repeated and the filter cake was subsequently pressed dry by means of a nitrogen pressure of 3 bar. For use in the polymerization, the total amount of the catalyst was re-suspended in 15 liters of isododecane.

Preparation of the Propylene Copolymer

An heterophasic propylene copolymer was produced, carrying out the polymerization process into two sequential gas-phase reactors operating under the conditions reported on Table 1. Propylene and ethylene were passed in gaseous form into the first polymerization reactor to prepare the copolymer matrix (A). The amount of metallocene catalyst metered in was such that the amount of polymer transferred from the first polymerization reactor into the second polymerization reactor corresponded, on average, to the amounts shown in Table 1. The metallocene catalyst was metered in together with the fresh propylene added to regulate the pressure. Triethylaluminum in the form of a 1 molar solution in heptane was likewise metered into the reactors. The propylene copolymer obtained in the first gas-phase reactor was transferred together with still active catalyst system into the second gas-phase reactor to obtain the propylene copolymer (B). The propylene copolymer features are collected in the same Table 1.

TABLE 1

| 1st gas-phase reactor | | |
| --- | --- | --- |
| Temperature | ° C. | 72-74 |
| Pressure | bar | 28 |
| C2/(C2 + C3) | pph* | 0.03-0.07 |
| 2nd gas phase reactor | | |
| Temperature | ° C. | 72-74 |
| Pressure | MPa | 15-18 |
| C2/(C2 + C3) | pph* | 0.30-0.33 |
| component (A) | | |
| split | wt % | 72 |
| C2 content | wt % | 2 |
| XS | wt % | <1 |
| component (B) | | |
| split | wt % | 28 |
| C2 content | wt % | 15 |
| XS | wt % | >50 |

*parts per hundred (vol/vol)

EXAMPLE 1

The injection-molding test was performed on a polyolefin composition obtained by melt blending 81 wt % of the thus obtained propylene copolymer with 14.5 wt % of a thermoplastic polyolefin having the following composition and properties:

(C1) 62 wt % of a propylene homopolymer having solubility in xylene lower than 3 wt %;

(C2) 38 wt % of an ethylene copolymer comprising (a) an ethylene/1-butene copolymer containing 70 wt % of units derived from 1-butene and (b) a propylene/ethylene copolymer containing 48.5 wt % of units derived from ethylene, wherein the weight ratio (a)/(b) is 1/2, said thermoplastic polyolefin having a Notched Izod Impact Strength at −20° C. of 8.5 kJ/m². The polyolefin composition additionally comprised 2.1 wt % of $TiO_2$ and 0.6 wt % of a 50/50 mixture of Irganox PS802 and Irganox B215 (traded by Ciba Specialty) as thermal stabilizer. The properties of the polymer composition are illustrated on Table 2.

The injection-molding test was carried out injecting the molten propylene copolymer (1) into a split injection mold fitted onto a steel pipe according to the process described above at a pressure of 150 bar and a temperature of 210° C.

COMPARATIVE EXAMPLE 2

The injection-molding test as described in Example 2 was carried out using a commercial propylene polymer containing 5.4 wt % of ethylene and 1.1 wt % of 1-butene having the properties collected in Table 2. The injection-molding test was carried out as described in Example 1.

TABLE 2

|  |  | Ex. 1 | Comp. Ex. 2 |
|---|---|---|---|
| Tpm | ° C. | 147.7 | 139.6 |
| Tpc | ° C. | 107.5 | 95.8 |
| Tpm − Tpc | ° C. | 40.2 | 43.8 |
| MFR | g/10 min | 29.3 | 8 |
| Mw/Mn |  | 2.8 | 5.2 |
| Spiral flow | mm | 1410 | 1030 |
| Flexural modulus | MPa | 562 | 575 |
| Elongation at break | % | >912 | >400 |
| Vicat Temp. | ° C. | 111.7 | 110 |
| Charpy notched 23° C. | kJ/m² | 47.6 | 24.0 |
| −20° C. | kJ/m² | 1.6 | 3.0 |

The propylene copolymer (I) of Example 1 shows excellent flowability when injection-molded on a metallic pipe according to the above described process. An injection-molded layer 4 mm thick was obtained. The cycle-time was of 3 min. for a steel pipe of 1067 mm of diameter and steel bar section length of 400 mm.

With propylene polymer of Comparative Example 2 an injection-molded layer 11 mm thick was obtained, the cycle time being 4 min and 30".

The invention claimed is:

1. A process comprising injection molding a coating of a propylene copolymer (I) onto the metallic surface of a connected portion of metallic pipes to form a re-insulated injection molded coating, the propylene copolymer (I) containing up to 50 wt % of units derived from at least one linear or branched alpha-olefin having from 2 to 10 carbon atoms other than propylene and having:

(a) a melting temperature (Tpm) equal to or less than 160° C.;

(b) a crystallization peak temperature (Tpc) of at least 100° C.;

(c) a temperature difference, Tpm - Tpc, equal to or less than 55° C.;

(d) a melt flow rate MFR (ISO1133, 230° C/2.16 Kg) ranging from 15 to 600 g/10min; and (e) a Mw/Mn of lower than 4.0, wherein propylene copolymer (I) is prepared using a metallocene-based catalyst.

2. The process according to claim 1 wherein said propylene copolymer (I) is selected from the group consisting of (i) propylene copolymers with at least one linear or branched alpha-olefin having from 2 to 10 carbon atoms other than propylene, said copolymer containing from 0.05 to 15 wt % of alpha-olefin units and having solubility in xylene lower than 15 wt %, (ii) propylene copolymer compositions comprising at least two propylene copolymers as described in (i), said copolymers having a different content of alpha-olefin units other than propylene, (iii) propylene copolymer compositions comprising at least one propylene copolymer as described in (i) and at least one propylene homopolymer having solubility in xylene lower than 15 wt %, and (iv) propylene polymer compositions comprising (A) 60-95 wt % of a propylene polymer selected from the group consisting of propylene homopolymers having solubility in xylene lower than 15 wt %, propylene copolymers as described in (i), and propylene copolymer compositions as described in (ii) or (iii); and (B) 5 to 40 wt % of a propylene copolymer with at least one linear or branched alpha-olefin having from 2 to 10 carbon atoms other than propylene, said copolymer (B) containing up to 50 wt %, with respect to the copolymer (B), of alpha-olefin units and having solubility in xylene of at least 50 wt %.

3. The process according to claim 1 wherein said propylene copolymer (I) comprises:

75-95 wt % of polymers selected from:

(i) propylene copolymers with at least one linear or branched alpha-olefin having from 2 to 10 carbon atoms other than propylene, said copolymer containing from 0.05 to 15 wt % of alpha-olefin units and having solubility in xylene lower than 15 wt %, (ii) propylene copolymer compositions comprising at least two propylene copolymers as described in (i), said copolymers having a different content of alpha-olefin units other than propylene, (iii) propylene copolymer compositions comprising at least one propylene copolymer as described in (i) and at least one propylene homopolymer having solubility in xylene lower than 15 wt % or (iv) propylene polymer compositions comprising: (A) 60-95 wt % of a propylene polymer selected from the group consisting of propylene homopolymers having solubility in xylene lower than 15 wt %, propylene copolymers as described in (i), propylene copolymer compositions as described in (ii) or (iii); and (B) 5 to 40 wt % of a propylene copolymer with at least one linear or branched alpha-olefin having from 2 to 10 carbon atoms other than propylene, said copolymer (B) containing up to 50 wt %, with respect to the copolymer (B), of alpha-olefin units and having solubility in xylene of at least 50 wt%; and 5-25 wt % of at least one thermoplastic elastomer, said thermoplastic elastomer having a ductile/brittle transition temperature lower than −20° C. and/or a Notched Izod Impact Strength at −20° C. higher than 5 kJ/m².

4. The process according to claim 3 wherein the thermoplastic elastomer is selected from the group consisting of (A) a propylene polymer compositions comprising:

(A1) 5-50 wt % of a polymer fraction selected among propylene homopolymers having solubility in xylene lower than 15 wt %, propylene copolymers with at least one linear or branched alpha-olefin having from 2 to 10 carbon atoms other than propylene, said copolymer containing from 0.05 to 15 wt % (with respect to the weight of the copolymer) of alpha-olefin units and having solubility in xylene lower than 15 wt %;

(A2) 0-20 wt % of a copolymer of ethylene with at least one linear or branched alpha-olefin having from 3 to 10 carbon atoms, said copolymer being insoluble in xylene; and (A3) 40-95 wt % of a copolymer of propylene with at least one linear or branched alphaolefin having 2 to 10 carbon atoms other than propylene, said copolymer containing less than 40 wt % of alpha-olefin units (with respect to the component (A3)) and having solubility in xylene higher than 50 wt %, (B) a propylene polymer composition comprising:

(B1) 8-25 wt % of a polymer fraction as described in (Al) and (B2) 75-92 wt % of a polymer fraction comprising:

(I) a first copolymer of propylene with at least one linear or branched alpha-olefin having from 2 to 10 carbon atoms other than propylene, said first copolymer containing from 15 to 32 wt % of alpha-olefin units and having solubility in xylene greater than 50 wt %, the intrinsic viscosity of the xylene soluble fraction ranging from 3.0 to 5.0 dl/g; and (II) a second copolymer of propylene with at least one linear or branched alpha-olefin having 2 to 10 carbon atoms other than propylene, said second copolymer containing more than 32 wt % up to 45 wt % of alpha-olefin units, and having solubility in xylene greater than 80 wt %, the intrinsic viscosity of the xylene soluble fraction ranging from 4.0 to 6.5 dl/g; and a (I)/(II) weight ratio ranging from 1:5 to 5:1, and (C) a propylene polymer composition comprising:

(C1) 50-98 wt % of a of a polymer fraction as described in (Al); and (C2) 2-50 wt % of an ethylene copolymer selected from the group consisting of (a) a copolymer of ethylene with at least one alpha-olefin having 4 to 10 carbon atoms containing from 60 to 85 wt % of ethylene units and (b) a composition comprising a copolymer as described in (a) and a copolymer of propylene with more than 15 wt % up to 40 wt % of ethylene, wherein the weight ratio (a)/(b) is from 1/4 to 4/1.

5. The process according to claim 1 wherein the injection-molded coating on the metallic pipe is up to 10 mm thick.

* * * * *